United States Patent
Banachowicz et al.

(10) Patent No.: US 9,883,128 B2
(45) Date of Patent: Jan. 30, 2018

(54) IMAGING SYSTEMS WITH HIGH DYNAMIC RANGE AND PHASE DETECTION PIXELS

(71) Applicant: SEMICONDUCTOR COMPONENTS INDUSTRIES, LLC, Phoenix, AZ (US)

(72) Inventors: Bartosz Piotr Banachowicz, San Jose, CA (US); Swarnal Borthakur, Boise, ID (US); Marko Mlinar, Horjul (SI); Ulrich Boettiger, Garden City, ID (US); Andrew Eugene Perkins, Boise, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 27 days.

(21) Appl. No.: 15/160,030

(22) Filed: May 20, 2016

(65) Prior Publication Data

US 2017/0339353 A1    Nov. 23, 2017

(51) Int. Cl.
*H04N 5/232* (2006.01)
*G03B 13/00* (2006.01)
*H04N 5/369* (2011.01)
*H04N 5/355* (2011.01)

(52) U.S. Cl.
CPC .............. *H04N 5/369* (2013.01); *H04N 5/355* (2013.01)

(58) Field of Classification Search
USPC ................................................ 348/350, 345
See application file for complete search history.

(56) References Cited

U.S. PATENT DOCUMENTS

| 2012/0194714 | A1  | 8/2012  | Yamashita |
| 2013/0015545 | A1  | 1/2013  | Toumiya et al. |
| 2013/0127002 | A1* | 5/2013  | Okigawa ........... H01L 27/14627 257/432 |
| 2013/0222546 | A1* | 8/2013  | Takahashi ......... H01L 27/14623 348/46 |
| 2014/0063300 | A1  | 3/2014  | Lin et al. |
| 2014/0347532 | A1* | 11/2014 | Kang .................... H04N 5/351 348/294 |
| 2015/0195467 | A1* | 7/2015  | Shim ................. H01L 27/14603 348/281 |

(Continued)

FOREIGN PATENT DOCUMENTS

EP    2833623    2/2015

*Primary Examiner* — Anthony J Daniels
(74) *Attorney, Agent, or Firm* — Treyz Law Group, P.C.; Joseph F. Guihan

(57) ABSTRACT

An image sensor may include a pixel array with high dynamic range functionality and phase detection pixels. The phase detection pixels may be arranged in phase detection pixel groups. Each phase detection pixel group may include three adjacent pixels arranged consecutively in a line. A single microlens may cover all three pixels in the phase detection pixel group, or two microlenses may combine to cover the three pixels in the phase detection pixel group. The edge pixels in each phase detection pixel group may have the same integration time and the same color. The middle pixel in each phase detection pixel group may have the same or different color as the edge pixels, and the same or different integration time as the edge pixels. Phase detection pixel groups may also be formed from two pixels that each are 1.5 times the size of neighboring pixels.

15 Claims, 24 Drawing Sheets

(56) References Cited

U.S. PATENT DOCUMENTS

2016/0050359 A1* 2/2016 Nakata .............. H01L 27/14621
 250/201.2
2016/0205311 A1* 7/2016 Mandelli ............ H04N 5/23212
 348/349

* cited by examiner

FIG.4

| R short | G short | R long | G short | R short | G short | R long | G short | R short | G short | R long | G short |
|---|---|---|---|---|---|---|---|---|---|---|---|
| G long | B short | G long | B long | G long | B short | G long | B long | G long | B short | G long | B long |
| R long | G short | R short | G short | R long | G short | R short | G short | R long | G short | R short | G short |
| G long | B long | G long | B short | G long | B long | G long | B short | G long | B long | G long | B short |
| R short | G short | R long | G short | R short | G short | R long | G short | R short | G short | R long | G short |
| G long | B short | G long | B long | G long | B short | G long | B long | G long | B short | G long | B long |
| R long | G short | R short | G short | R long | G short | R short | G short | R long | G short | R short | G short |
| G long | B long | G long | B short | G long | B long | G long | B short | G long | B long | G long | B short |

| R short | G short | R long | G short | R short | G long | R short | G short | R short | G long | R short | G short |
|---|---|---|---|---|---|---|---|---|---|---|---|
| G long | B short | G long | B long | G long | B short | G long | B long | G long | B short | G long | B long |
| R long | G short | R short | G short | R long | G short | R short | G short | R short | G long | R short | G short |
| G long | G long | G long | B short | G long | G long | G long | B short | G long | G long | G long | B short |
| R short | G short | R long | G short | R short | G long | R short | G short | R short | G long | R short | G short |
| G long | B short | G long | B long | G long | B short | G long | B long | G long | B short | G long | B long |
| R long | G short | R short | G short | R long | G short | R short | G short | R short | G long | R short | G short |
| G long | G long | G long | B short | G long | G long | G long | B short | G long | G long | G long | B short |

FIG. 7

| R short | G short | R long | G short | R short | G long | R short | G short | R short | G long | R short | G short |
|---|---|---|---|---|---|---|---|---|---|---|---|
| G long | B short | G long | B long | G long | B short | G long | B long | G long | B short | G long | B long |
| R long | G short | G short | G short | R long | G short | G short | G short | R long | G short | G short | G short |
| G long | B long | G long | B short | G long | B long | G long | B short | G long | B long | G long | B short |
| R short | G short | R long | G short | R short | G long | R short | G short | R short | G long | R short | G short |
| G long | B short | G long | B long | G long | B short | G long | B long | G long | B short | G long | B long |
| R long | G short | G short | G short | R long | G short | G short | G short | R long | G short | G short | G short |
| G long | B long | G long | B short | G long | B long | G long | B short | G long | B long | G long | B short |

FIG.8

| R short | G short | R long | G short | R short | G long | R long | G short | R short | G long | R short | G short |
|---|---|---|---|---|---|---|---|---|---|---|---|
| G long | B short | G long | B long | G long | B short | G long | B long | G long | B short | G long | B long |
| R long | G short | R short | G short | R long | G short | R short | G short | R long | G short | R short | G short |
| G long | G long | G long | B short | G long | G long | G long | B short | G long | G long | G long | B short |
| R short | G short | R long | G short | R short | G long | R short | G short | R short | G long | R short | G short |
| G long | B short | G long | B long | G long | B short | G long | B long | G long | B short | G long | B long |
| R long | G short | G short | G short | R long | G short | G short | G short | R long | G short | G short | G short |
| G long | B long | G long | B short | G long | B long | G long | B short | G long | B long | G long | B short |

| R short | G short | R long | G short | R short | G short | R long | G short | R short | G short | R long | G short |
|---|---|---|---|---|---|---|---|---|---|---|---|
| G long | B short | G long | B long | G long | B short | G long | B long | G long | B short | G long | B long |
| R long | G short | R short | G short | R long | G short | R short | G short | R long | G short | R short | G short |
| G long | B long | G long | G short | G long | B long | G long | G short | G long | B long | G long | B short |
| R short | G short | R long | G short | R short | G short | R long | G short | R short | G short | R long | G short |
| G long | B short | G long | B long | G long | B short | G long | B long | G long | B short | G long | B long |
| R long | G short | R short | G short | R long | G short | R short | G short | R long | G short | R short | G short |
| G long | B long | G long | G short | G long | B long | G long | G short | G long | B long | G long | B short |

FIG.11

| R short | G short | R long | G short | R short | G short | R long | G short | R long | G short | R long | G short |
|---|---|---|---|---|---|---|---|---|---|---|---|
| G long | B short | G long | B long | G long | B short | G long | B long | G long | B short | G long | B long |
| R long | G short | R short | G short | R long | G short | R short | G long | R short | G short | R short | G short |
| G long | B long | G long | B short | G long | B long | G long | B short | G long | B long | G long | B short |
| R short | G short | R long | G short | R short | G short | R long | G short | R short | G long | R short | G short |
| G long | B short | G long | B long | G long | B short | G long | B long | G long | B short | G long | B long |
| R long | G short | R short | G short | R long | G short | R short | G long | R short | G short | R short | G short |
| G long | B long | G long | B short | G long | B long | G long | B short | G long | B long | G long | B short |

FIG.12

| R short | G short | R long | G short | R short | G long | R short | G short | R long | G short | R long | G short |
|---|---|---|---|---|---|---|---|---|---|---|---|
| G long | B short | G long | B long | G long | B short | G long | B long | G long | B short | G long | B long |
| R long | G short | R short | G short | R long | G short | R short | G short | R long | G short | R short | G short |
| G long | G long | G long | B short | G long | G long | G long | B short | G long | G long | G long | B short |
| R short | G short | R long | G short | R short | G short | R long | G short | R short | G short | R long | G short |
| G long | B short | G long | B long | G long | B short | G long | B long | G long | B short | G long | B long |
| R long | G short | R short | G short | R long | G short | R short | G short | R long | G short | R short | G short |
| G long | B long | G long | G short | G long | B long | G long | G short | G long | B long | G long | B short |

FIG.13

| R short | G short | R long | G short | R short | G short | R long | G short | R short | G short | R long | G short |
|---|---|---|---|---|---|---|---|---|---|---|---|
| G long | B short | G long | B long | G long | B short | G long | B long | G long | B short | G long | B long |
| R long | G short | R short | G short | R long | G short | R short | G short | R long | G short | R short | G short |
| G long | B long | G long | B short | G long | B long | G long | B short | G long | B long | G long | B short |
| R short | G short | R long | G short | R short | G short | R long | G short | R short | G short | R long | G short |
| G long | B short | G long | B long | G long | B short | G long | B long | G long | B short | G long | B long |
| R long | G short | R short | G short | R long | G short | R short | G short | R long | G short | R short | G short |
| G long | B long | G long | B short | G long | B long | G long | B short | G long | B long | G long | B short |

FIG.14

| R short | G short | R long | G short | R short | G short | R short | G short | R short | G short | R long | G short |
|---|---|---|---|---|---|---|---|---|---|---|---|
| G long | B short | G long | B long | G long | B short | G long | B long | G long | B short | G long | B long |
| R long | G short | R short | G short | R long | G short | R short | G short | R long | G short | R short | G short |
| G long | G long | G long | B short | G long | B long | G long | B short | G long | B long | G long | B short |
| R short | G short | R long | G short | R short | G short | R short | G short | R short | G short | R long | G short |
| G long | B short | G long | B long | G long | B short | G long | B long | G long | B short | G long | B long |
| R long | G short | R short | G short | R long | G short | R short | G short | R long | G short | R short | G short |
| G long | B long | G long | B short | G long | B long | G long | B short | G long | G long | G long | B short |

FIG.15

| R short | G short | R long | G short | R short | G short | R long | G short | R short | G short | R long | G short |
|---|---|---|---|---|---|---|---|---|---|---|---|
| G long | B short | G long | B long | G long | B short | G long | B long | G long | B short | G long | B long |
| R long | G short | R short | G short | R long | G short | R short | G short | R long | G short | R short | G short |
| G long | B long | G long | B short | G long | B long | G long | B short | G long | B long | G long | B short |
| R short | G short | R long | G short | R short | G short | R long | G short | R short | G short | R long | G short |
| G long | B short | G long | B long | G long | B short | G long | B long | G long | B short | G long | B long |
| R long | G short | R short | G short | R long | G short | R short | G short | R long | G short | R short | G short |
| G long | B long | G long | B short | G long | B long | G short | B long | G long | B long | G long | B short |

IMAGING SYSTEMS WITH HIGH DYNAMIC RANGE AND PHASE DETECTION PIXELS

BACKGROUND

This relates generally to imaging systems and, more particularly, to imaging systems with phase detection capabilities.

Modern electronic devices such as cellular telephones, cameras, and computers often use digital image sensors. Imager sensors (sometimes referred to as imagers) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

Some applications such as automatic focusing and three-dimensional (3D) imaging may require electronic devices to provide stereo and/or phase detection capabilities. For example, to bring an object of interest into focus for an image capture, an electronic device may need to identify the distances between the electronic device and object of interest. To identify distances, conventional electronic devices use complex arrangements. Some arrangements require the use of multiple image sensors and camera lenses that capture images from various viewpoints. Other arrangements require the addition of lenticular arrays that focus incident light on sub-regions of a two-dimensional pixel array. Due to the addition of components such as additional image sensors or complex lens arrays, these arrangements lead to reduced spatial resolution, increased cost, and increased complexity.

Conventional imaging systems also may have images with artifacts associated with low dynamic range. Scenes with bright and dark portions may produce artifacts in conventional image sensors, as portions of the image may be over exposed or under exposed.

It would therefore be desirable to be able to provide improved imaging systems with phase detection capabilities.

BRIEF DESCRIPTION OF THE DRAWINGS

FIG. 4 is a top view of an illustrative pixel array with phase detection pixel groups of a long integration time and an uninterrupted color filter pattern in accordance with an embodiment of the present invention.

FIG. 5 is a top view of an illustrative pixel array with phase detection pixel groups of a short integration time and an uninterrupted color filter pattern in accordance with an embodiment of the present invention.

FIG. 6 is a top view of an illustrative pixel array with phase detection pixel groups having either all short integration pixels or all long integration pixels and an uninterrupted color filter pattern in accordance with an embodiment of the present invention.

FIG. 7 is a top view of an illustrative pixel array with phase detection pixel groups of a long integration time and an interrupted color filter pattern in accordance with an embodiment of the present invention.

FIG. 8 is a top view of an illustrative pixel array with phase detection pixel groups of a short integration time and an interrupted color filter pattern in accordance with an embodiment of the present invention.

FIG. 9 is a top view of an illustrative pixel array with phase detection pixel groups having either all short integration pixels or all long integration pixels and an interrupted color filter pattern in accordance with an embodiment of the present invention.

FIG. 10 is a top view of an illustrative pixel array with phase detection pixel groups having both short and long integration pixels and an uninterrupted color filter pattern in accordance with an embodiment of the present invention.

FIG. 11 is a top view of an illustrative pixel array with phase detection pixel groups having both short and long integration pixels and an interrupted color filter pattern in accordance with an embodiment of the present invention.

FIG. 12 is a top view of an illustrative pixel array with some phase detection pixel groups that have both short and long integration pixels, some phase detection pixel groups that have all long integration pixels, and an uninterrupted color filter pattern in accordance with an embodiment of the present invention.

FIG. 13 is a top view of an illustrative pixel array with some phase detection pixel groups that have both short and long integration pixels, some phase detection pixel groups that have all long integration pixels, and an interrupted color filter pattern in accordance with an embodiment of the present invention.

FIG. 14 is a top view of an illustrative pixel array with scattered phase detection pixel groups of a long integration time and an uninterrupted color filter pattern in accordance with an embodiment of the present invention.

FIG. 15 is a top view of an illustrative pixel array with scattered phase detection pixel groups of a long integration time and an interrupted color filter pattern in accordance with an embodiment of the present invention.

FIG. 16 is a top view of an illustrative pixel array with scattered phase detection pixel groups having both short and long integration pixels and an uninterrupted color filter pattern in accordance with an embodiment of the present invention.

FIG. 31 is a top view of an illustrative pixel array with phase detection pixel groups formed from two pixels that each are 1.5 times the size of the neighboring pixels in accordance with an embodiment of the present invention.

DETAILED DESCRIPTION

Figure 1:
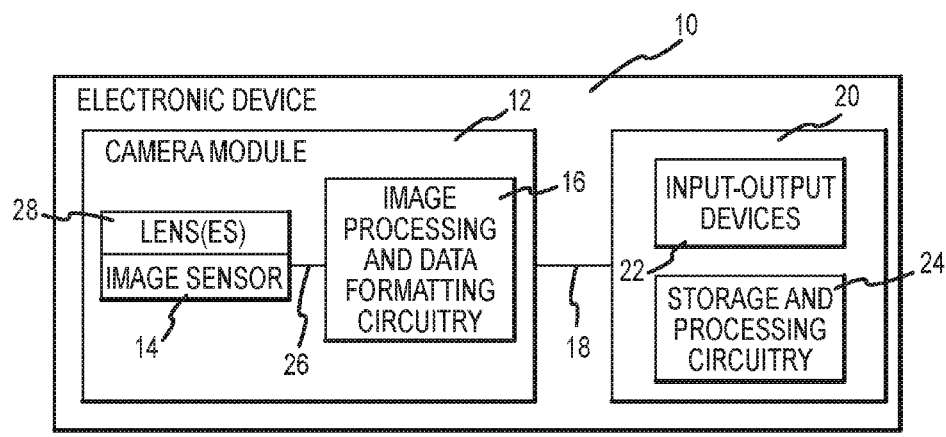
FIG. 1 is a schematic diagram of an illustrative electronic device with an image sensor that may include phase detection pixels in accordance with an embodiment of the present invention.

Embodiments of the present invention relate to image sensors with phase detection capabilities. An electronic device with a digital camera module is shown in FIG. 1. Electronic device 10 may be a digital camera, a computer, a cellular telephone, a medical device, or other electronic device. Camera module 12 (sometimes referred to as an imaging device) may include image sensor 14 and one or more lenses 28. During operation, lenses 28 (sometimes referred to as optics 28) focus light onto image sensor 14. Image sensor 14 includes photosensitive elements (e.g., photodiodes) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 14 may be provided to image processing and data formatting circuitry 16 via path 26. Image processing and data formatting circuitry 16 may be used to perform image processing functions such as automatic focusing functions, depth sensing, phase detection, data formatting, adjusting white balance and exposure, implementing video image stabilization, face detection, etc. For example, during automatic focusing operations, image processing and data formatting circuitry 16 may process data gathered by phase detection pixels in image sensor 14 to determine the magnitude and direction of lens movement (e.g., movement of lens 28) needed to bring an object of interest into focus.

Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common integrated circuit. The use of a single integrated circuit to implement camera sensor 14 and image processing and data formatting circuitry 16 can help to reduce costs. This is, however, merely illustrative. If desired, camera sensor 14 and image processing and data formatting circuitry 16 may be implemented using separate integrated circuits. If desired, camera sensor 14 and image processing circuitry 16 may be formed on separate semiconductor substrates. For example, camera sensor 14 and image processing circuitry 16 may be formed on separate substrates that have been stacked.

Camera module 12 may convey acquired image data to host subsystems 20 over path 18 (e.g., image processing and data formatting circuitry 16 may convey image data to subsystems 20). Electronic device 10 typically provides a user with numerous high-level functions. In a computer or advanced cellular telephone, for example, a user may be provided with the ability to run user applications. To implement these functions, host subsystem 20 of electronic device 10 may include storage and processing circuitry 24 and input-output devices 22 such as keypads, input-output ports, joysticks, and displays. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, or other processing circuits.

It may be desirable to provide image sensors with phase detection capabilities (e.g., to use in automatic focusing applications, 3D imaging applications such as machine vision applications, etc.). To provide phase detection capabilities, image sensor 14 may include phase detection pixel groups such as phase detection pixel group 100 shown in FIG. 2A.

Figure 2A:
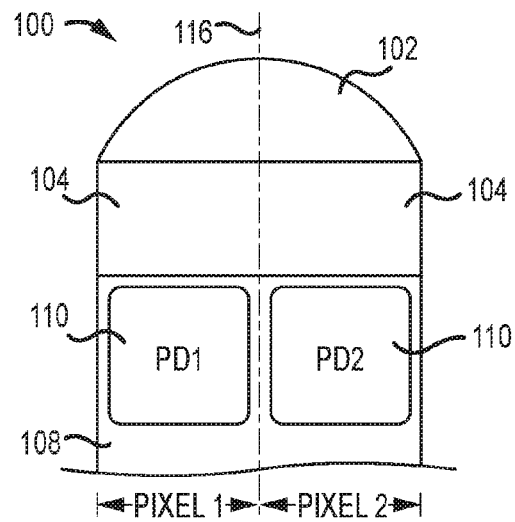
FIG. 2A is a cross-sectional side view of illustrative phase detection pixels having photosensitive regions that each have asymmetric angular responses in accordance with an embodiment of the present invention.

FIG. 2A is an illustrative cross-sectional view of pixel group 100. In FIG. 2A, phase detection pixel group 100 is a pixel pair. Pixel pair 100 may include first and second pixels such Pixel 1 and Pixel 2. Pixel 1 and Pixel 2 may include photosensitive regions such as photosensitive regions 110 formed in a substrate such as silicon substrate 108. For example, Pixel 1 may include an associated photosensitive region such as photodiode PD1, and Pixel 2 may include an associated photosensitive region such as photodiode PD2. A microlens may be formed over photodiodes PD1 and PD2 and may be used to direct incident light towards photodiodes PD1 and PD2. The arrangement of FIG. 2A in which microlens 102 covers two pixel regions may sometimes be referred to as a 2×1 or 1×2 arrangement because there are two phase detection pixels arranged consecutively in a line. In an alternate embodiment, three phase detection pixels may be arranged consecutively in a line in what may sometimes be referred to as a 1×3 or 3×1 arrangement.

Color filters such as color filter elements 104 may be interposed between microlens 102 and substrate 108. Color filter elements 104 may filter incident light by only allowing predetermined wavelengths to pass through color filter elements 104 (e.g., color filter 104 may only be transparent to the wavelengths corresponding to a green color, a red color, a blue color, a yellow color, a cyan color, a magenta color, visible light, infrared light, etc.). Color filter 104 may be a broadband color filter. Examples of broadband color filters include yellow color filters (e.g., yellow color filter material that passes red and green light) and clear color filters (e.g., transparent material that passes red, blue, and green light). In general, broadband filter elements may pass two or more colors of light. Photodiodes PD1 and PD2 may serve to absorb incident light focused by microlens 102 and produce pixel signals that correspond to the amount of incident light absorbed.

Photodiodes PD1 and PD2 may each cover approximately half of the substrate area under microlens 102 (as an example). By only covering half of the substrate area, each photosensitive region may be provided with an asymmetric angular response (e.g., photodiode PD1 may produce different image signals based on the angle at which incident light reaches pixel pair 100). The angle at which incident light reaches pixel pair 100 relative to a normal axis 116 (i.e., the angle at which incident light strikes microlens 102 relative to the optical axis 116 of lens 102) may be herein referred to as the incident angle or angle of incidence.

An image sensor can be formed using front side illumination imager arrangements (e.g., when circuitry such as metal interconnect circuitry is interposed between the microlens and photosensitive regions) or back side illumination imager arrangements (e.g., when photosensitive regions are interposed between the microlens and the metal interconnect circuitry). The example of FIGS. 2A, 2B, and 2C in which pixels 1 and 2 are backside illuminated image sensor pixels is merely illustrative. If desired, pixels 1 and 2 may be front side illuminated image sensor pixels. Arrangements in which pixels are backside illuminated image sensor pixels are sometimes described herein as an example.

Figures 2B, 2C:
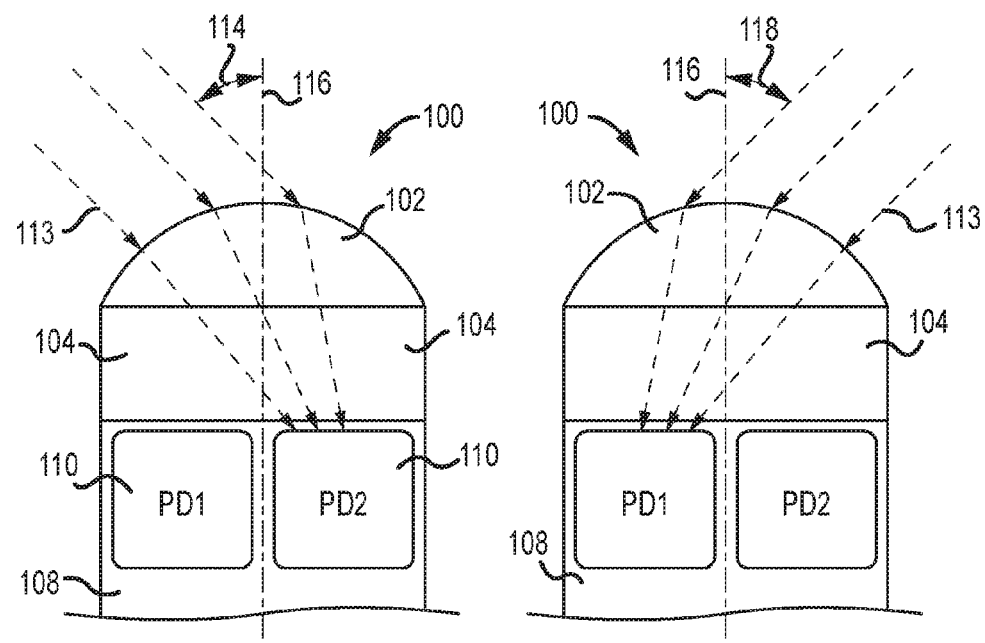
FIGS. 2B and 2C are cross-sectional views of the phase detection pixels of FIG. 2A in accordance with an embodiment of the present invention.

In the example of FIG. 2B, incident light 113 may originate from the left of normal axis 116 and may reach pixel pair 100 with an angle 114 relative to normal axis 116. Angle 114 may be a negative angle of incident light. Incident light 113 that reaches microlens 102 at a negative angle such as angle 114 may be focused towards photodiode PD2. In this scenario, photodiode PD2 may produce relatively high image signals, whereas photodiode PD1 may produce relatively low image signals (e.g., because incident light 113 is not focused towards photodiode PD1).

In the example of FIG. 2C, incident light 113 may originate from the right of normal axis 116 and reach pixel pair 100 with an angle 118 relative to normal axis 116. Angle 118 may be a positive angle of incident light. Incident light that reaches microlens 102 at a positive angle such as angle 118 may be focused towards photodiode PD1 (e.g., the light is not focused towards photodiode PD2). In this scenario, photodiode PD2 may produce an image signal output that is relatively low, whereas photodiode PD1 may produce an image signal output that is relatively high.

The positions of photodiodes PD1 and PD2 may sometimes be referred to as asymmetric positions because the center of each photosensitive area 110 is offset from (i.e., not aligned with) optical axis 116 of microlens 102. Due to the asymmetric formation of individual photodiodes PD1 and PD2 in substrate 108, each photosensitive area 110 may have an asymmetric angular response (e.g., the signal output produced by each photodiode 110 in response to incident light with a given intensity may vary based on an angle of incidence).

Figure 3:
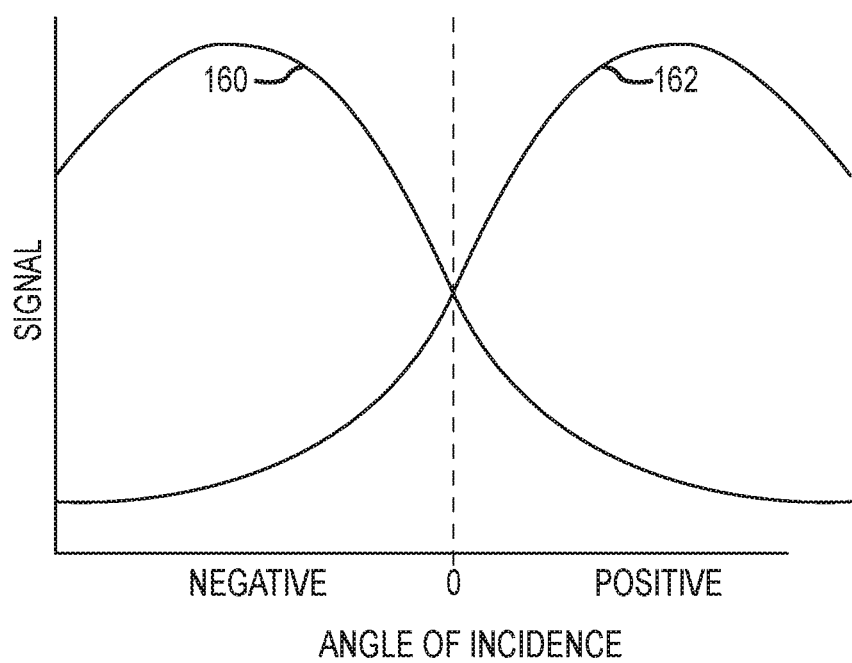
FIG. 3 is a diagram of illustrative signal outputs of photosensitive regions of phase detection pixels for incident light striking the phase detection pixels at varying angles of incidence in accordance with an embodiment of the present invention.

In the diagram of FIG. 3, an example of the image signal outputs of photodiodes PD1 and PD2 of pixel pair 100 in response to varying angles of incident light is shown. Line 160 may represent the output image signal for photodiode PD2 whereas line 162 may represent the output image signal for photodiode PD1. For negative angles of incidence, the output image signal for photodiode PD2 may increase (e.g., because incident light is focused onto photodiode PD2) and the output image signal for photodiode PD1 may decrease (e.g., because incident light is focused away from photodiode PD1). For positive angles of incidence, the output image signal for photodiode PD2 may be relatively small and the output image signal for photodiode PD1 may be relatively large.

The size and location of photodiodes PD1 and PD2 of pixel pair 100 of FIGS. 2A, 2B, and 2C are merely illustrative. If desired, the edges of photodiodes PD1 and PD2 may be located at the center of pixel pair 100 or may be shifted slightly away from the center of pixel pair 100 in any direction. If desired, photodiodes 110 may be decreased in size to cover less than half of the pixel area.

Output signals from pixel pairs such as pixel pair 100 may be used to adjust the optics (e.g., one or more lenses such as lenses 28 of FIG. 1) in image sensor 14 during automatic focusing operations. The direction and magnitude of lens movement needed to bring an object of interest into focus may be determined based on the output signals from pixel pairs 100.

For example, by creating pairs of pixels that are sensitive to light from one side of the lens or the other, a phase difference can be determined. This phase difference may be used to determine both how far and in which direction the image sensor optics should be adjusted to bring the object of interest into focus.

When an object is in focus, light from both sides of the image sensor optics converges to create a focused image. When an object is out of focus, the images projected by two sides of the optics do not overlap because they are out of phase with one another. By creating pairs of pixels where each pixel is sensitive to light from one side of the lens or the other, a phase difference can be determined. This phase difference can be used to determine the direction and magnitude of optics movement needed to bring the images into phase and thereby focus the object of interest. Pixel groups that are used to determine phase difference information such as pixel pair 100 are sometimes referred to herein as phase detection pixels or depth-sensing pixels.

A phase difference signal may be calculated by comparing the output pixel signal of PD1 with that of PD2. For example, a phase difference signal for pixel pair 100 may be determined by subtracting the pixel signal output of PD1 from the pixel signal output of PD2 (e.g., by subtracting line 162 from line 160). For an object at a distance that is less than the focused object distance, the phase difference signal may be negative. For an object at a distance that is greater than the focused object distance, the phase difference signal may be positive. This information may be used to automatically adjust the image sensor optics to bring the object of interest into focus (e.g., by bringing the pixel signals into phase with one another).

As previously mentioned, the example in FIGS. 2A-2C where phase detection pixel group 100 includes two adjacent pixels is merely illustrative. In another illustrative embodiment, phase detection pixel group 100 may include three adjacent pixels. Examples of embodiments of this type are shown in FIGS. 4-16.

Figure 4:
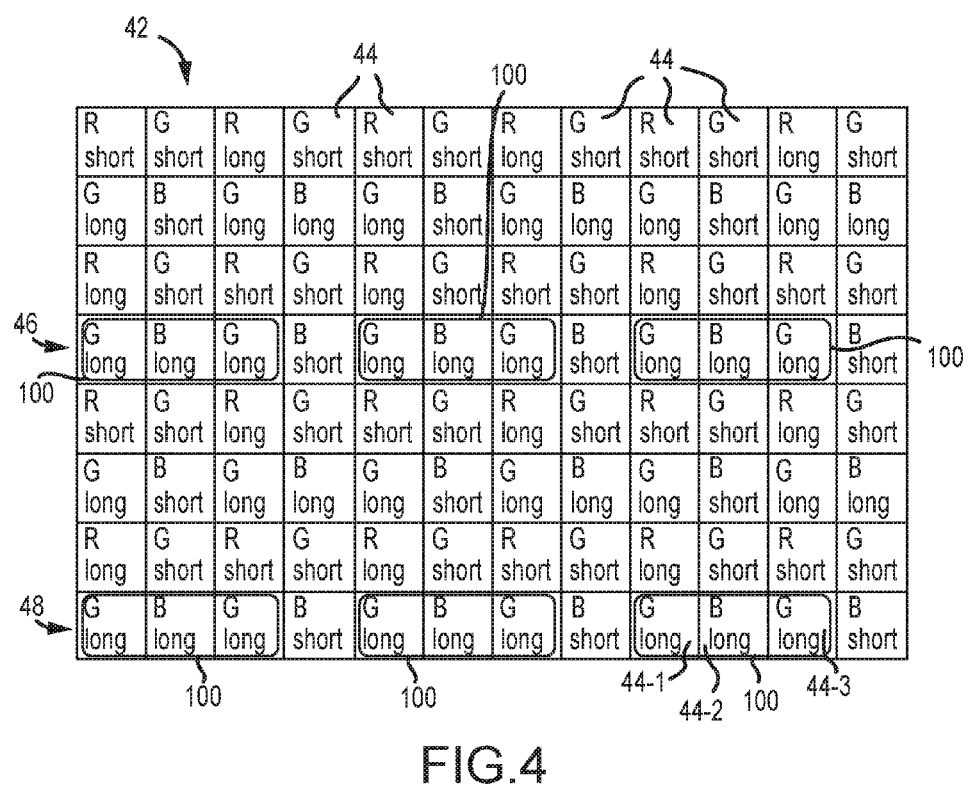

FIG. 4 shows an illustrative pixel array 42 with phase detection pixel groups 100. Pixel array 42 includes a color filter array. Pixels marked with an R include a red color filter, pixels marked with a G include a green color filter, and pixels marked with a B include a blue color filter. The pattern of color filters in pixel array 100 is a Bayer mosaic pattern which includes a repeating unit cell of two-by-two image pixels 44 having two green image pixels arranged on one diagonal and one red and one blue image pixel arranged on the other diagonal. This example is merely illustrative, and other color filter patterns may be used if desired. For example, a broadband color filter (e.g., a yellow or clear color filter) may be used instead of a green color filter in the color filter array.

Phase detection pixel groups 100 may be included in the pixel array. As shown, phase detection pixel groups 100 may be arranged in a line within a row of the pixel array. For example, phase detection pixels may be arranged in an interrupted line in rows 46 and 48. Each phase detection pixel group may be separated by a single intervening pixel, two intervening pixels, three intervening pixels, or more than three intervening pixels. In another embodiment, the phase detection pixel groups may be arranged without any intervening pixels (i.e., in a continuous line instead of an interrupted line). The rows with phase detection pixel groups may be separated by any desired distance. For example, phase detection pixel groups may be arranged in adjacent rows or may be separated by one intervening row, two intervening rows, three intervening rows, more than three intervening rows, more than five intervening rows, more than ten intervening rows, or more than twenty-five intervening rows.

The phase detection pixel groups may include groups of three adjacent pixels that are arranged such that the phase detection pixels on the edges of the group (i.e., pixels 44-1 and 44-3) have the same color. The pixel in the center of the group (i.e., pixel 44-2) may have a different color than the edge pixels. In FIG. 4, the pixels at the edge of each phase detection pixel group may be green, while the center pixel may be blue. Imaging signals from the two edge pixels (i.e., pixels 44-1 and 44-3) may be analyzed to determine phase information. Imaging signals from pixels 44-1 and 44-2 may also be analyzed to determine phase information. Imaging signals from pixels 44-3 and 44-2 may also be analyzed to determine phase information.

If desired, pixel array 42 may be used in high dynamic range applications. In order to increase the dynamic range of the imaging sensor, different pixels in the pixel array may be exposed to incident light for different amounts of time. For example, some of the pixels in pixel array 42 may have a first integration time, while some of the pixels in the pixel array may have a second integration time. The first integration time may be different than the second integration time. For example, the first integration time may be shorter than the second integration time. Pixels with the shorter integration time may be labeled "short," while pixels with the longer integration time may be labeled "long."

The integration times of the pixels may be determined using any desired arrangement. In one possible arrangement, each row of the pixel array may have a corresponding integration time. For example, every other row may have a short integration time, while every other row may have a long integration time. In another possible arrangement which is shown in FIG. 4, the integration times may vary in each row in column. This type of arrangement may sometimes be referred to as a "zig-zag" arrangement.

The pixels in the phase detection pixel groups may have either short or long integration times. As shown in the example of FIG. 4, each pixel in the phase detection pixel groups may have the same length integration time. In FIG. 4, pixels 44-1, 44-2, and 44-3 all have a long integration time. However, this example is merely illustrative. In another possible arrangement shown in FIG. 5, each pixel in the phase detection pixel groups may have a short integration time. As shown in FIG. 5, pixels 44-1, 44-2, and 44-3 may have short integration times. Pixels 44-1 and 44-3 may be green pixels while pixel 44-2 may be a red pixel. In both FIGS. 4 and 5, the edge pixels of the phase detection pixel groups have the same length integration time, which may be advantageous during processing of the pixel signals.

Figure 6:
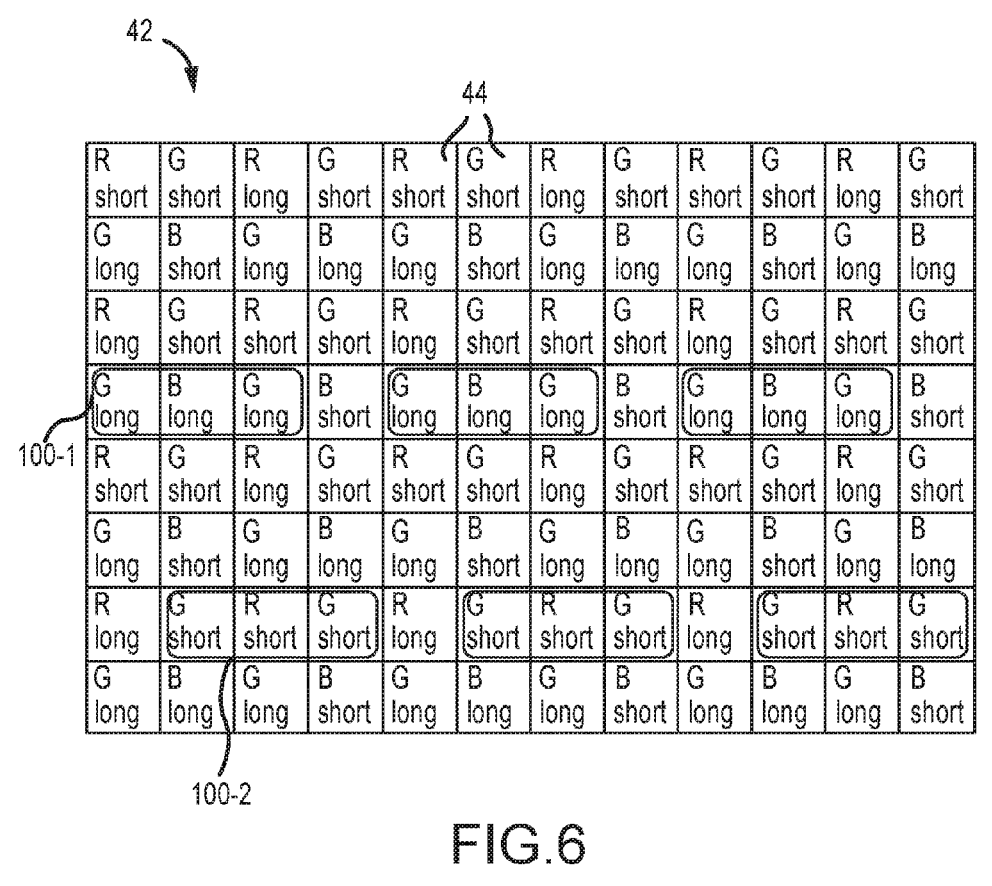

FIG. 6 shows an illustrative pixel array with phase detection pixel groups 100. Similar to FIGS. 4 and 5, the phase detection pixel groups in FIG. 6 may each have the same length integration time. However, some phase detection pixel groups (i.e., group 100-1) may have pixels with long integration times, while some phase detection pixel groups (i.e., group 100-2) may have pixels with short integration times.

In the embodiments shown in FIGS. 4-6, the phase detection pixel groups have color filters that match the surrounding color filter pattern (i.e., the Bayer color filter pattern is uninterrupted). This may be desirable for image processing, because algorithms correcting for optical crosstalk between pixels may be more effective when the color filter pattern is uninterrupted. However, the example of an uninterrupted color filter pattern is merely illustrative. If desired, the color filter pattern may be changed.

FIG. 7 shows an illustrative pixel array where the underlying color filter pattern is interrupted in the phase detection pixel groups. As shown in FIG. 7, the edge pixels 44-1 and 44-3 may have green color filters that match the color filter pattern. However, the central pixel 44-2 also has a green color filter, and this green color filter does not match the color filter pattern. Having the central pixel match the color of the edge pixels may be advantageous for gathering phase detection data in certain circumstances. Similar to FIG. 4, FIG. 7 shows phase detection pixel groups that all have pixels with long integration times. Instead of a blue central pixel (as shown in FIG. 4), the groups of FIG. 7 have a green central pixel.

FIG. 8 shows another illustrative pixel array where the underlying color filter pattern is interrupted in the phase detection pixel groups. As opposed to FIG. 7, the phase detection pixel groups of FIG. 8 all have short integration times. Additionally, instead of a red central pixel (as shown in FIG. 5), the groups of FIG. 8 have a green central pixel. Pixel groups of the types shown in FIGS. 7 and 8 can both be used in a single pixel array, as shown in FIG. 9. In FIG. 9, the phase detection pixel groups all have the same color. However, some phase detection pixel groups (i.e., group 100-1) may have pixels with long integration times, while some phase detection pixel groups (i.e., group 100-2) may have pixels with short integration times.

Figure 10:
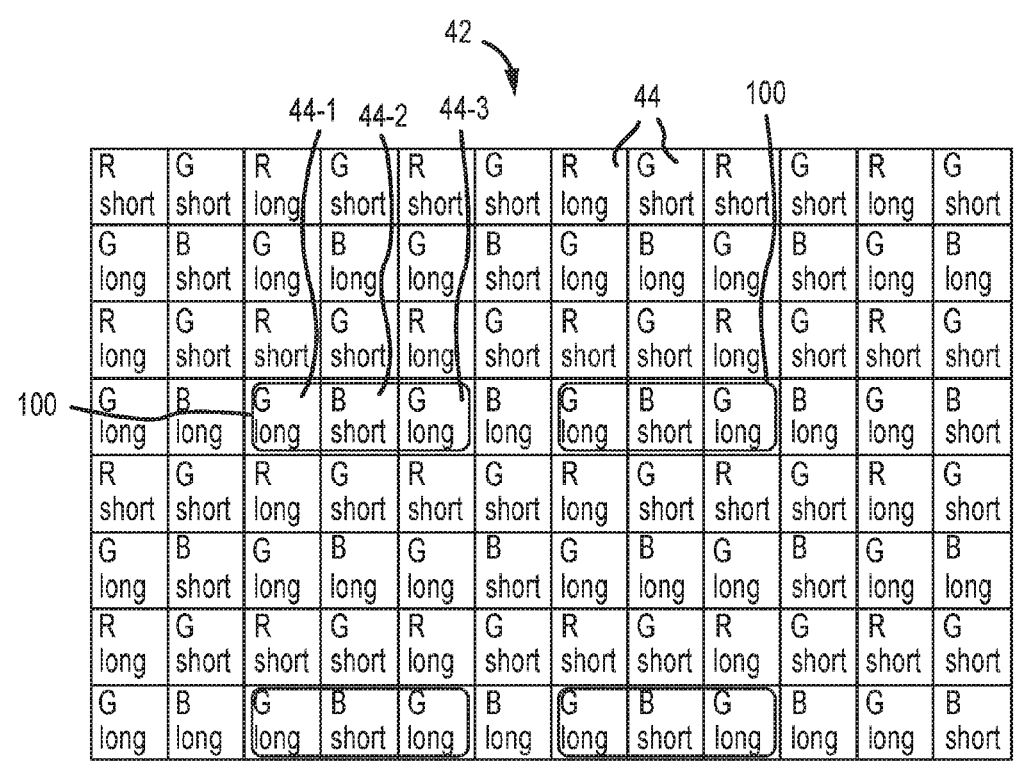

In FIGS. 4-9, the phase detection pixel groups all have central pixels with integration times that match the integration times of the edge pixels. However, this example is merely illustrative. If desired, the phase detection pixel groups may have central pixels with integration times that do not match the integration times of the edge pixels. An arrangement of this type is shown in FIG. 10. As shown, center pixel 44-2 may have a short integration time, while edge pixels 44-1 and 44-3 have a long integration time. In FIG. 10 the color filter pattern is uninterrupted. Central pixel 44-2 has a blue color filter while edge pixels 44-1 and 44-3 have green color filters.

The example of FIG. 10 where the edge pixels of the phase detection pixel groups have a long integration time and the center pixel of the phase detection pixel groups has a short integration time is merely illustrative. If desired, the edge pixels of the phase detection pixel groups may have a short integration time and the center pixel of the phase detection pixel groups may have a long integration time. In these embodiments, the edge pixels may have green color filters while the center pixel may have a red color filter element, or each pixel may have a green color filter element. In general, each pixel in the phase detection pixel group may have any desired integration time or color filter element.

FIG. 11 shows a pixel array where the phase detection pixel groups have central pixels with integration times that do not match the integration times of the edge pixels, and the color filter pattern is interrupted. As shown, similar to FIG. 10, center pixel 44-2 may have a short integration time while edge pixels 44-1 and 44-3 have a long integration time. However, instead of central pixel 44-2 having a blue color filter (as shown in FIG. 10), central pixel 44-2 may have a green color filter.

FIG. 12 shows a pixel array where some of the phase detection pixel groups (e.g., group 100-1) have central pixels with integration times that match the integration times of the edge pixels and other phase detection pixel groups (e.g., group 100-2) have central pixels with integration times that do not match the integration times of the edge pixels. The color filter pattern of FIG. 12 is uninterrupted. FIG. 13 shows a pixel array that is similar to the array of FIG. 12. Some of the phase detection pixel groups (e.g., group 100-1) in FIG. 13 have central pixels with integration times that match the integration times of the edge pixels and other phase detection pixel groups (e.g., group 100-2) in FIG. 13 have central pixels with integration times that do not match the integration times of the edge pixels. In contrast to FIG. 12, however, the color filter pattern of FIG. 13 may be interrupted. As shown in FIG. 13, the central pixels of each phase detection pixel group may have color filters that match the color filters of the edge pixels.

In the pixel arrays shown in FIGS. 4-13, the phase detection pixel groups were arranged in interrupted lines (i.e., at least one intervening pixel is positioned between each phase detection pixel group). However, this example is merely illustrative. As shown in FIG. 14, the phase detection pixel groups may instead be scattered throughout the array. In FIG. 14, the scattered phase detection pixel groups all have the same length integration times, and the color filter pattern is uninterrupted. In FIG. 15, the scattered phase detection pixel groups all have the same length integration times, and the color filter pattern is disrupted so that all of the phase detection pixels have the same color. In FIG. 16, the scattered phase detection pixel groups have different length integration times (i.e., the phase detection pixel groups have central pixels with integration times that do not match the integration times of the edge pixels), and the color filter pattern is uninterrupted.

The examples of phase detection pixel groups in FIGS. 4-16 are merely illustrative. In general, the phase detection pixel groups may have pixels with any desired combination of colors and integration times. In addition, the phase detection pixel groups may be located in any desired pattern throughout the array.

In FIGS. 4-16, the phase detection pixel groups are shown as being arranged horizontally in a single row. This example is merely illustrative, and other orientations of the phase detection pixel groups may be used if desired. For example, the phase detection pixel groups may be arranged vertically in a single column. In yet another embodiment, the phase detection pixel groups may extend diagonally at a 45 degree angle across multiple rows and columns. Every phase detection pixel group in the array does not have to have the same orientation. For example, some phase detection pixel groups may be arranged horizontally and some phase detection pixel groups may be arranged vertically. Any desired combination of phase detection pixel group orientations may be used.

Figure 17:
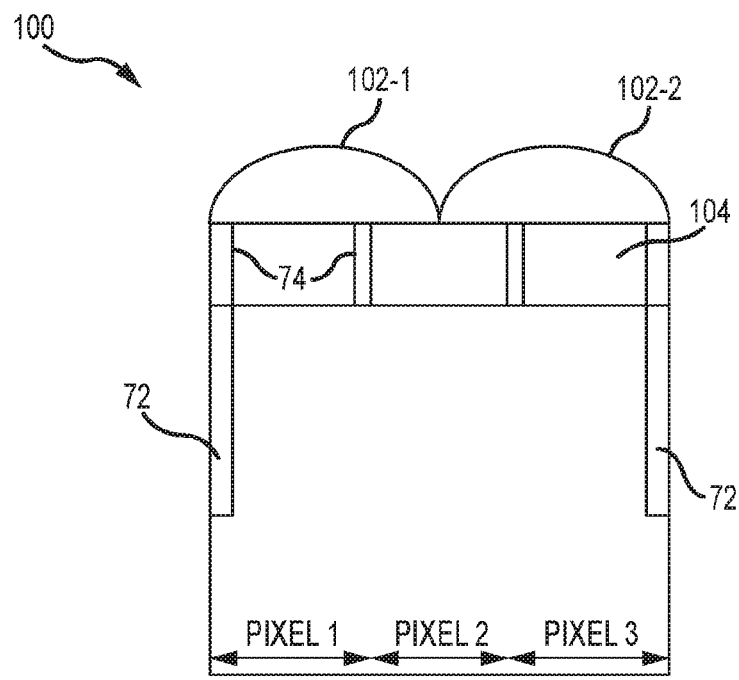
FIG. 17 is a cross-sectional side view of an illustrative phase detection pixel group with two microlenses covering three pixels in accordance with an embodiment of the present invention.

One or more microlenses may be used to cover the pixels in the phase detection pixel groups. There are a variety of different microlens arrangements that may be used, as shown in FIGS. 17-20. FIG. 17 shows an illustrative phase detection pixel group 100 with three pixels covered by two microlenses. As shown in FIG. 17, each pixel may be covered by a respective color filter 104. Backside deep trench isolation 72 may be formed around the phase detection pixel group. Additionally, composite grid 74 may be formed in between the color filter elements. Two microlenses may be formed over the three pixels. Microlens 102-1 may cover all of pixel 1 and at least some portion of pixel 2. Microlens 102-2 may cover all of pixel 3 and at least some portion of pixel 2. In FIG. 17, each microlens is shown as covering 1.5 pixels. However, this example is merely illustrative. If desired, each microlens may cover 1.2 pixels, 1.3, pixels, less than 1.3 pixels, between 1 and 1.5 pixels, more than 1.3 pixels, or 1.5 pixels.

Figure 18:
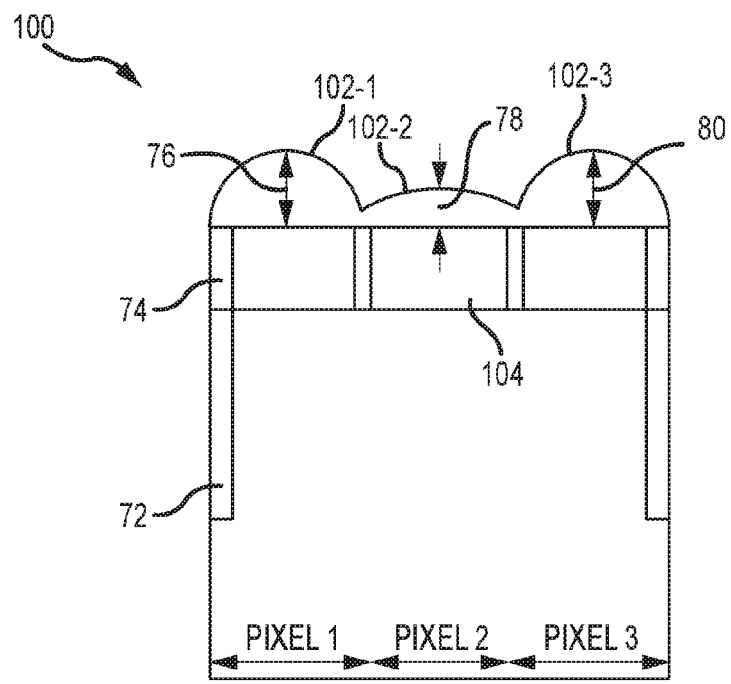
FIG. 18 is a cross-sectional side view of an illustrative phase detection pixel group with a short, convex microlens covering the central pixel in accordance with an embodiment of the present invention.

FIG. 18 shows another illustrative microlens arrangement for phase detection pixel group 100. As shown, pixels 1, 2, and 3, may have respective microlenses 102-1, 102-2, and 102-3. Microlens 102-1 may have a height 76, microlens 102-2 may have a height 78, and microlens 102-3 may have a height 80. Heights 76 and 80 may be greater than height 78. Microlenses 102-1, 102-2, and 102-3 may all be convex microlenses.

Figure 19:
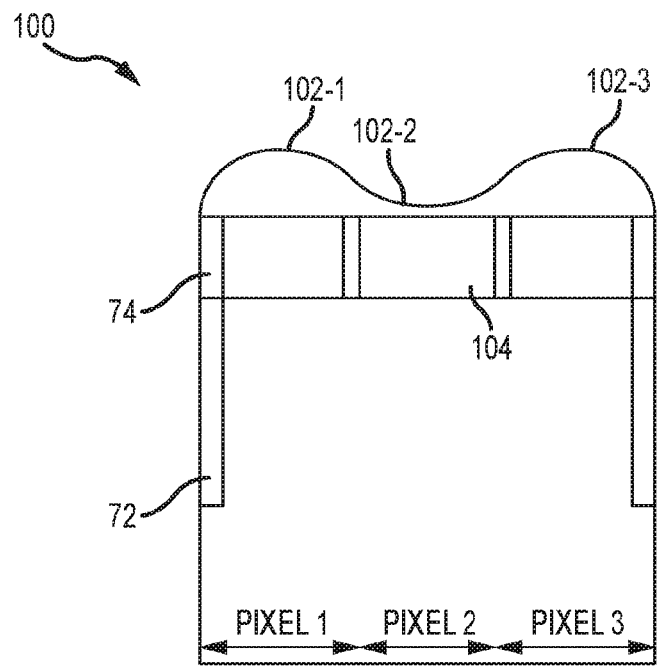
FIG. 19 is a cross-sectional side view of an illustrative phase detection pixel group with a concave microlens covering the central pixel in accordance with an embodiment of the present invention.

FIG. 19 shows another illustrative microlens arrangement for phase detection pixel group 100. As shown, pixels 1, 2, and 3, may have respective microlenses 102-1, 102-2, and 102-3. Microlenses 102-1 and 102-3 may be convex, while microlens 102-2 may be concave.

In another embodiment, three adjacent pixels may be covered by a single microlens (similar to the arrangement shown in FIG. 2A but with three pixels instead of two).

Figure 20:
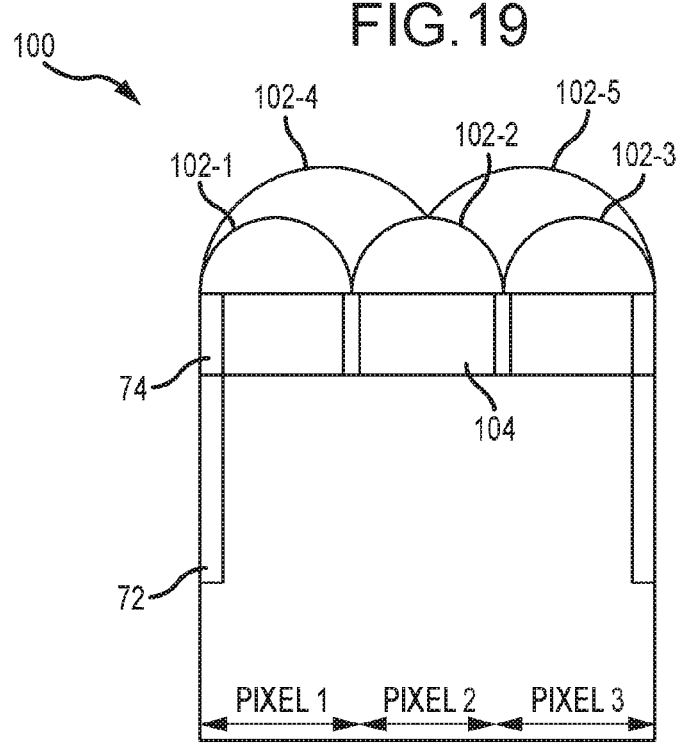
FIG. 20 is a cross-sectional side view of an illustrative phase detection pixel group with a lens-on-lens microlens arrangement in accordance with an embodiment of the present invention.

In the aforementioned microlens arrangements, microlenses are formed on color filter elements 104. This type of arrangement may sometimes be referred to as a lens-on-gap arrangement. Other types of microlens arrangements where microlenses are formed on other microlenses, sometimes referred to as lens-on-lens arrangements, may be used. FIG. 20 shows an illustrative lens-on-lens arrangement for phase detection pixel group 100. Microlens 102-1 may cover pixel 1, microlens 102-2 may cover pixel 2, and microlens 102-3 may cover pixel 3. Microlenses 102-1, 102-2, and 102-3 may be formed with the same dimensions (and during the same manufacturing step) as the microlenses in the rest of the pixel array. Microlenses 102-4 and 102-5 may subsequently be formed over microlenses 102-1, 102-2, and 102-3. Microlens 102-4 may cover all of pixel 1 and at least some portion of pixel 2. Microlens 102-5 may cover all of pixel 3 and at least some portion of pixel 2. In FIG. 20, microlenses 102-4 and 102-5 are shown as covering 1.5 pixels. However, this example is merely illustrative. If desired, microlenses 102-4 and 102-5 may each cover 1.2 pixels, 1.3, pixels, less than 1.3 pixels, more than 1.3 pixels, or 1.5 pixels. By forming microlenses 102-4 and 102-5 on top of microlenses 102-1, 102-2, and 102-3, microlenses 102-4 and 102-5 will have a greater height than in a lens-on-gap arrangement. The greater height of microlenses 102-4 and 102-5 may enable better phase detection performance in the pixels.

Figure 21:
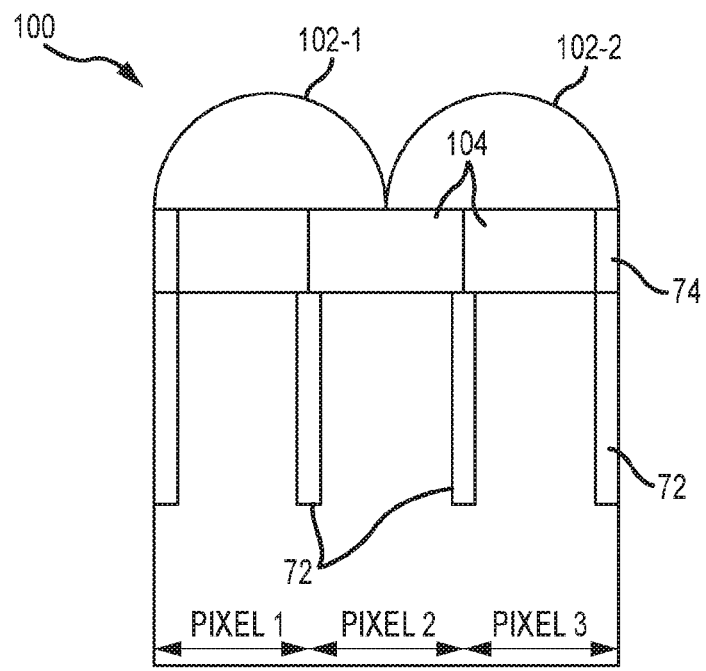
FIG. 21 is a cross-sectional side view of an illustrative phase detection pixel group with central backside deep trench isolation in accordance with an embodiment of the present invention.

As shown in FIG. 21, backside deep trench isolation 72 may be formed around pixel 2 in phase detection pixel group 100 if desired. The backside deep trench isolation may provide additional shielding to avoid cross-talk between pixels 1, 2, and 3. Backside deep trench isolation structures 72 may be a p-type doped oxide (e.g., boron doped glass). In some embodiments, deep trench isolation structures 72 may instead be a p-type doped polysilicon (e.g., boron doped polysilicon). In other embodiments, deep trench isolation structures 72 may be a p-type doped polysilicon (e.g., boron doped polysilicon) having a liner (e.g., a phosphorous doped oxide liner). Backside deep trench isolation structures 72 may be conformally coated with one or more oxides (e.g., hafnium oxide, titanium oxide, zirconium oxide, tantalum oxide, silicon dioxide, etc.). The oxide coating may passivate the exposed silicon surface, reducing the generation of dark current in the pixel. In yet other embodiments, deep trench isolation structures 72 may be a refractory metal (e.g., tungsten, molybdenum or other metals having a resistance to high heat, corrosion and wear) having a p-type oxide liner (e.g., boron doped oxide). In general, backside deep trench isolation 72 may be formed from any desired material. In FIG. 21, backside deep trench isolation is formed around each pixel. Backside deep trench isolation 72 may completely surround the photodiode of each pixel if desired.

Figure 22:
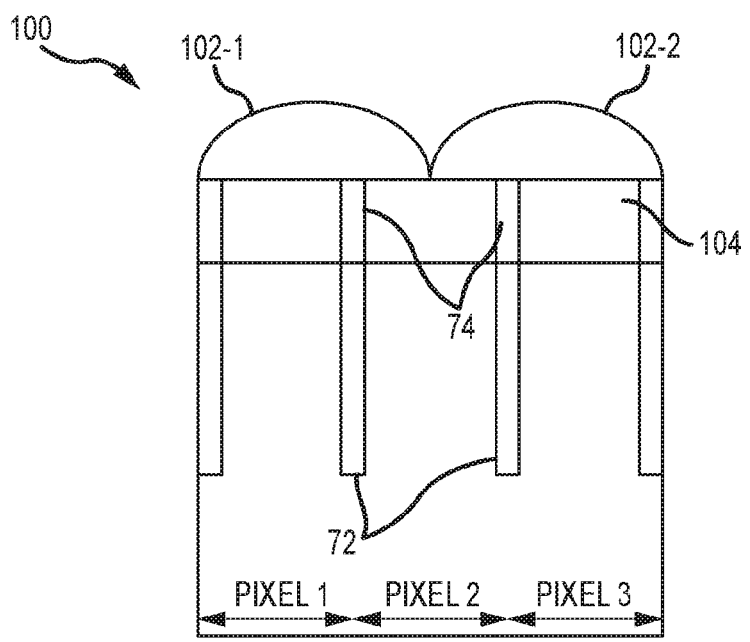
FIG. 22 is a cross-sectional side view of an illustrative phase detection pixel group with central backside deep trench isolation and a composite grid in accordance with an embodiment of the present invention.

FIG. 21 also shows a shielding element 74 formed around the periphery of the color filter elements of the phase detection pixel group. In the embodiment of FIG. 21, no shielding element is formed around the color filter element of pixel 2. FIG. 22 shows an alternate embodiment where backside deep trench isolation 72 is formed around pixel 2. In FIG. 22, shielding elements 74 are formed around the color filter element of pixel 2. Shielding elements 74 may be formed from tungsten or another desired metal. Shielding elements 74 may also be formed from a metal oxide or a composite material. For example, shielding elements may contain one or more of silicon dioxide, silicon oxynitride, silicon nitride, tantalum, tantalum nitride, titanium, titanium nitride, tungsten, and tungsten nitride. In general, shielding elements 74 may be formed from any desired material or combination of materials that are opaque and therefore do not pass incident light. In the arrangement of FIG. 22 the shielding elements may sometimes be referred to as a composite grid.

Figure 23:
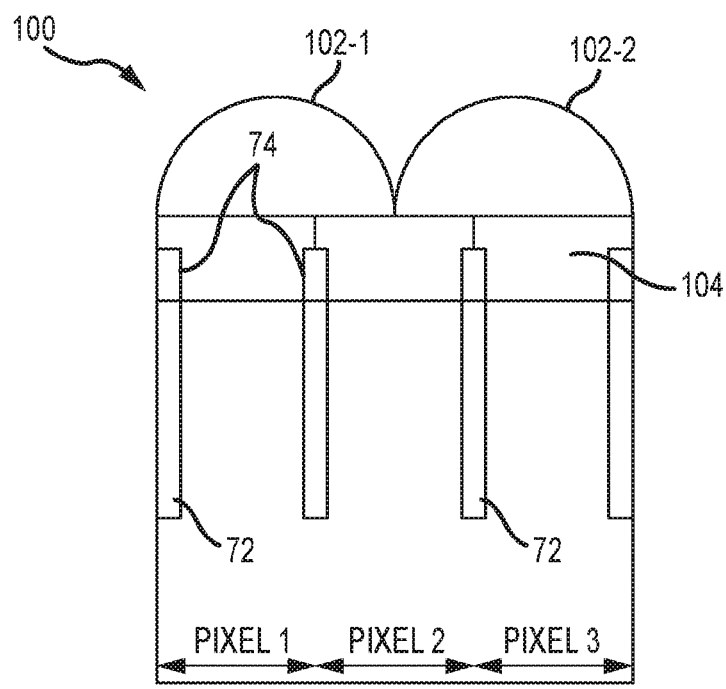
FIG. 23 is a cross-sectional side view of an illustrative phase detection pixel group with central backside deep trench isolation and embedded shielding elements in accordance with an embodiment of the present invention.

FIG. 23 shows an alternate embodiment where backside deep trench isolation 72 is formed around pixel 2. In FIG. 23, shielding elements 74 may not have the same height as the color filter elements 104. In FIG. 23 the shielding elements 74 may be referred to as being embedded in the color filter array.

Figure 24:
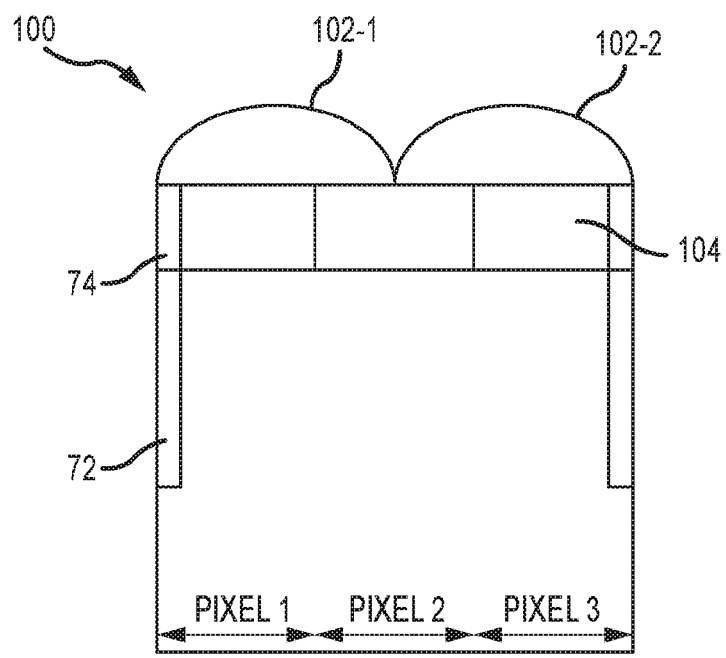
FIG. 24 is a cross-sectional side view of an illustrative phase detection pixel group without central backside deep trench isolation in accordance with an embodiment of the present invention.
Figure 25:
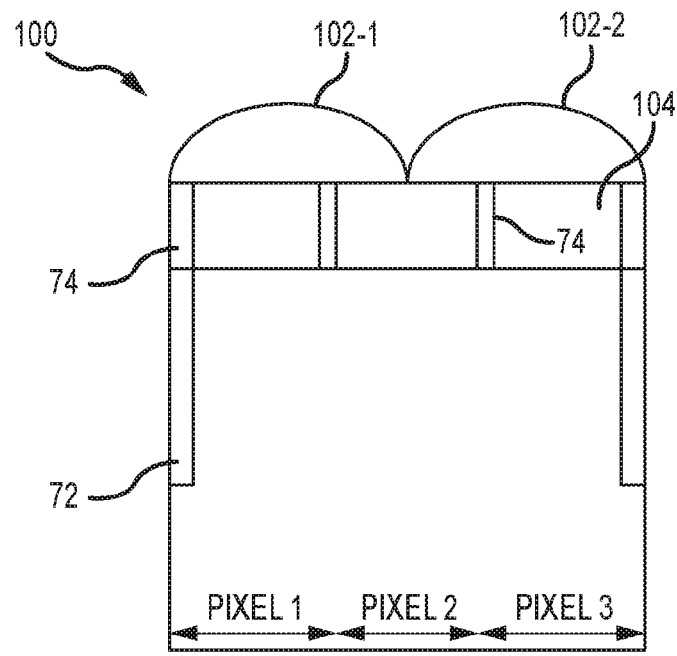
FIG. 25 is a cross-sectional side view of an illustrative phase detection pixel group without central backside deep trench isolation and including a composite grid in accordance with an embodiment of the present invention.
Figure 26:
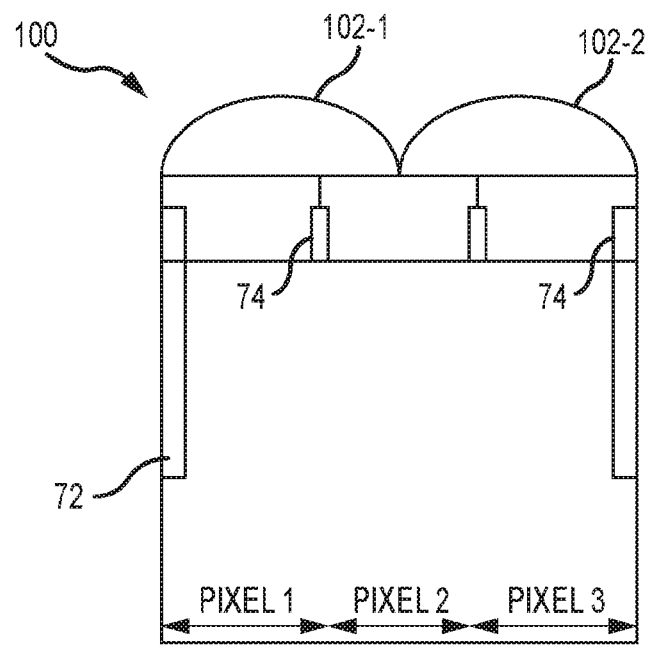
FIG. 26 is a cross-sectional side view of an illustrative phase detection pixel group without central backside deep trench isolation and including embedded shielding elements in accordance with an embodiment of the present invention.

The arrangements of shielding elements 74 shown in FIGS. 21-23 may also be used in phase detection pixel groups without backside deep trench isolation formed around pixel 2. In FIG. 24, no backside deep trench isolation is formed around pixel 2 and no shielding elements are formed around the color filter element of pixel 2. In FIG. 25, no backside deep trench isolation is formed around pixel 2 and a composite grid is formed between the color filter elements. In FIG. 26, no backside deep trench isolation is formed around pixel 2 and shielding elements 74 are embedded between the color filter elements 104.

Figure 27:
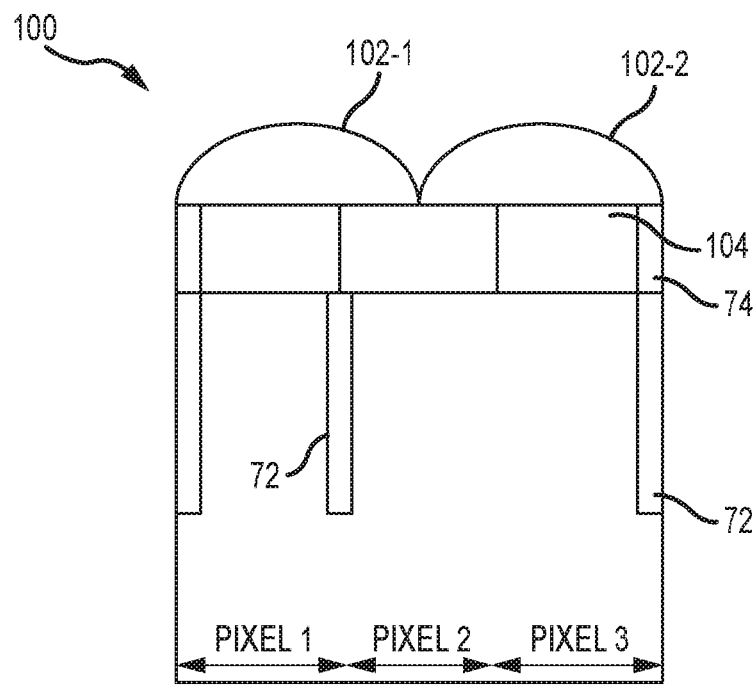
FIG. 27 is a cross-sectional side view of an illustrative phase detection pixel group with central backside deep trench isolation that partially surrounds a central pixel in accordance with an embodiment of the present invention.

If desired, backside deep trench isolation may be formed on only one side of pixel 2 in phase detection pixel group 100. An arrangement of this type is shown in FIG. 27. In general, backside deep trench isolation may be formed around any portion of any pixel in the phase detection pixel group and have any desired depth (varying or uniform).

In yet another embodiment, backside deep trench isolation may be formed around pixel 2 that is shorter than the backside deep trench isolation formed around the phase detection pixel group. For example, the backside deep trench isolation formed around the phase detection pixel group may have a first depth. The backside deep trench isolation formed around pixel 2 may have a second depth. The second depth may be approximately half of the first depth, less than half of the first depth, or greater than half of the first depth. In general, the backside deep trench isolation may be formed with any desired dimensions at any desired location.

Figure 28:
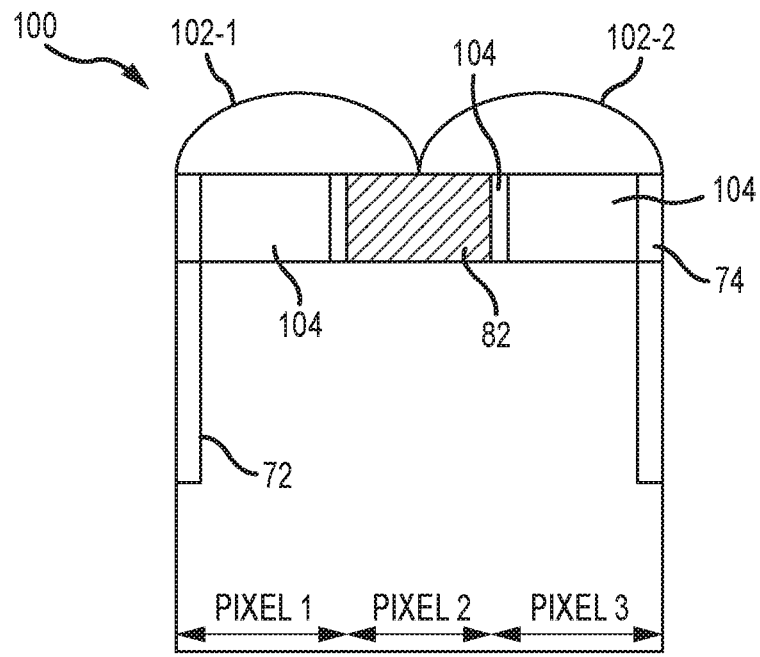
FIG. 28 is a cross-sectional side view of an illustrative phase detection pixel group with a shielding element that partially covers a central pixel in accordance with an embodiment of the present invention.
Figure 29:
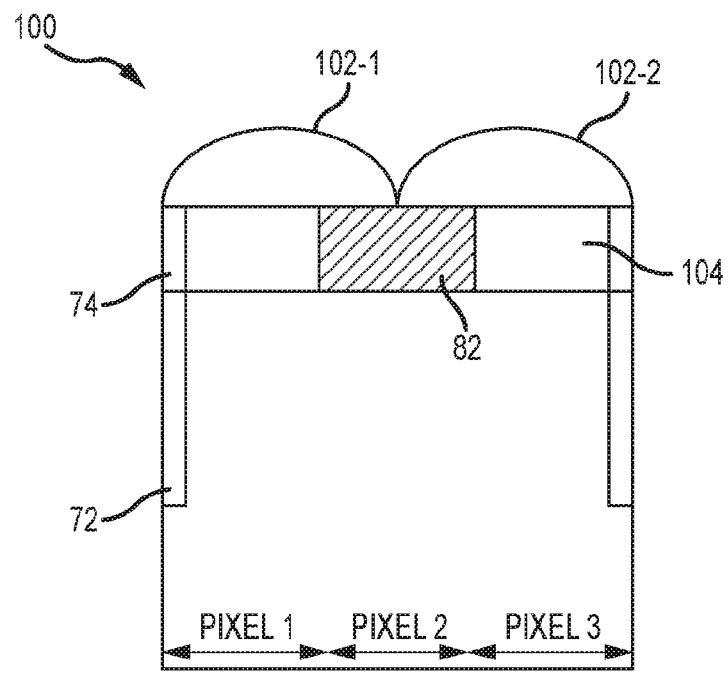
FIG. 29 is a cross-sectional side view of an illustrative phase detection pixel group with a shielding element that completely covers a central pixel in accordance with an embodiment of the present invention.
Figure 30:
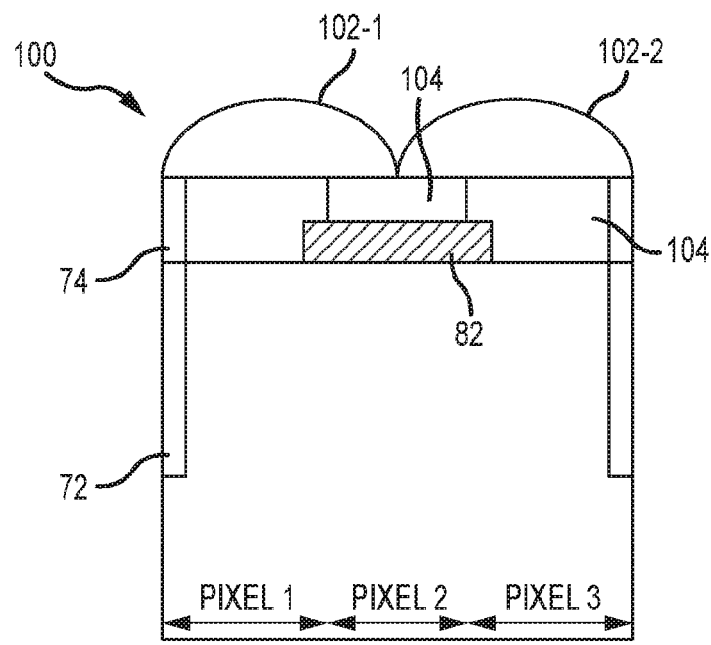
FIG. 30 is a cross-sectional side view of an illustrative phase detection pixel group with a shielding element that is embedded in a color filter array in accordance with an embodiment of the present invention.

As shown in FIG. 28, an additional shielding element 82 may be included to block pixel 2 in phase detection pixel group 100. As shown in FIG. 28, shielding element 82 may only partially cover pixel 2. As shown in FIG. 29, shielding element 82 may completely cover pixel 2. As shown in FIG. 30, shielding element 82 may completely cover pixel 2 and overlap portions of pixels 1 and 3. Additionally, the height of shielding element 82 may be less than that of the color filter elements. Shielding element 82 in FIG. 30 may be said to be embedded in the color filter array.

Figure 31:
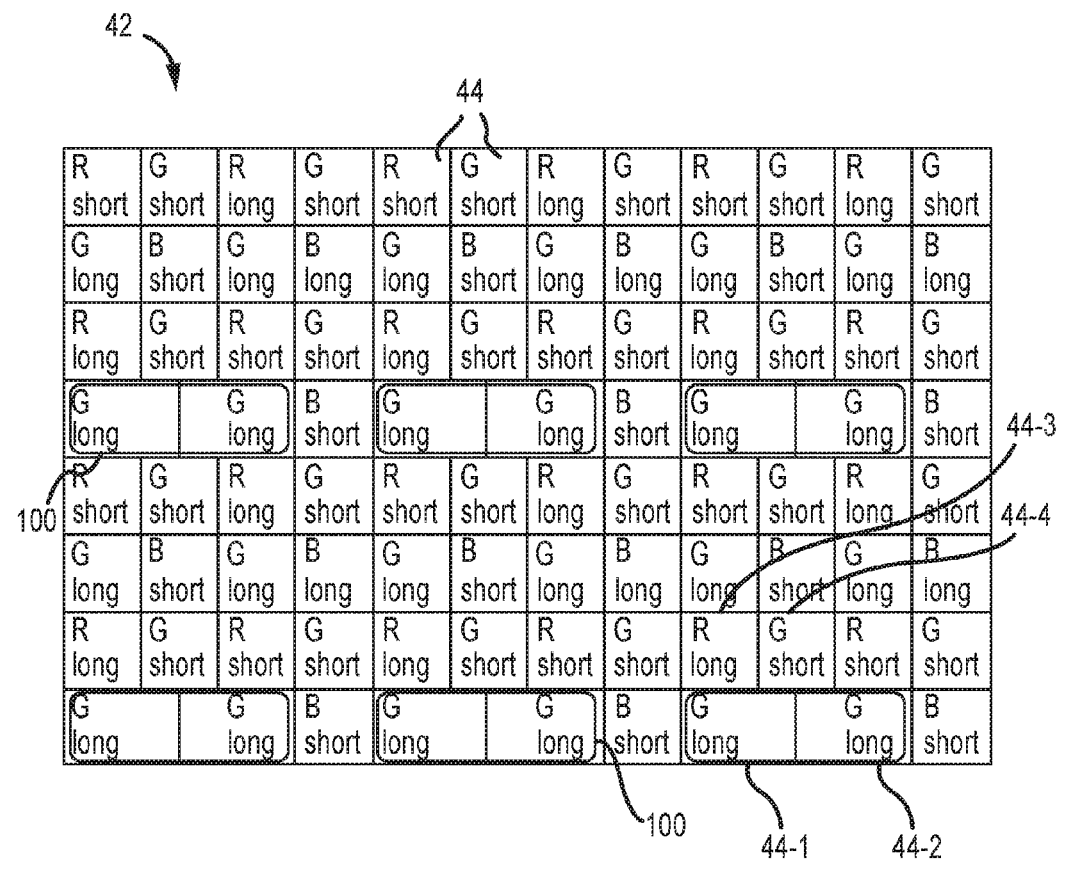

Instead of phase detection pixel group 100 including three adjacent pixels, phase detection pixel group 100 may include two adjacent oversized pixels. An arrangement of this type is shown in FIG. 31. As shown, phase detection pixel group 100 may include pixels 44-1 and 44-2. Pixels 44-1 and 44-2 may be 1.5 times as large as neighboring pixels 44-3 and 44-4. Pixels 44-1 and 44-2 may have the same length integration times and the same color. In FIG. 31, pixels 44-1 and 44-2 are shown as both having long integration times. However, this example is merely illustrative. If desired, pixels 44-1 and 44-2 may each have short integration time, or the pixels may have different integration times. Additionally, FIG. 31 shows pixels 44-1 and 44-2 as both having green color filter elements. This example is merely illustrative, and pixels 44-1 and 44-2 may have color filter elements of any desired color. The color filter elements of pixels 44-1 and 44-2 may be different colors if desired.

In various embodiments of the present invention, an image sensor may have a pixel array, and the pixel array may include a plurality of image pixels that gather image data and a plurality of phase detection pixels that gather phase information. The phase detection pixels may be arranged in phase detection pixel groups, and each phase detection pixel group may include three adjacent pixels. The three adjacent pixels may be arranged consecutively in a line. The three adjacent pixels of each phase detection pixel group may be covered by a single microlens. The three adjacent pixels of each phase detection pixel group may include a first pixel, a second pixel, and a third pixel. The second pixel may be interposed between the first and third pixels, a first microlens may cover the first pixel and at least a portion of the second pixel, and a second microlens may cover the third pixel and at least an additional portion of the second pixel. The first microlens may cover all of the first pixel and a first half of the second pixel, and the second microlens may cover all of the third pixel and a second half of the third pixel.

The three adjacent pixels of each phase detection pixel group may include a first pixel, a second pixel, and a third pixel, the second pixel may be interposed between the first and third pixels, a first microlens may cover the first pixel, a second microlens may cover the second pixel, a third microlens may cover the third pixel, a fourth microlens may cover the first microlens and at least a portion of the second microlens, and a fifth microlens may cover the third microlens and at least an additional portion of the second microlens. The phase detection pixel groups may be arranged in interrupted lines. The image sensor may also include a color filter array. Each phase detection pixel may include a respective color filter element, and the color filter elements of the phase detection pixels may all be the same color. The first and third pixels may include color filter elements of a first color, and the second pixel may include a color filter element of a second color that is different than the first color. The second pixel may be separated from the first and third pixels by backside deep trench isolation. The image sensor may also include shielding elements interposed between color filter elements of the color filter array. The second pixel may be at least partially covered by a shielding element.

The plurality of image pixels may include a first group of image pixels that are configured to generate charge for a first integration time and a second group of image pixels that are configured to generate charge for a second integration time. The first integration time may be different than the second integration time. The three adjacent pixels of each phase detection pixel group may include a first pixel, a second pixel, and a third pixel. The second pixel may be interposed between the first and third pixels, the first and third pixels may be configured to generate charge for the first integration time, and the second pixel may be configured to generate charge for the second integration time. The three adjacent pixels of each phase detection pixel group may be configured to generate charge for the first integration time.

In various embodiments, an image sensor may have a pixel array that includes a plurality of image pixels that gather image data and a plurality of phase detection pixels that gather phase information. The plurality of image pixels may include a first group of image pixels with a first integration time and a second group of image pixels with a second integration time, and the first integration time may be different than the second integration time. The plurality of phase detection pixels may be arranged in phase detection pixel groups. Each phase detection pixel group may include a first pixel, a second pixel, and a third pixel arranged consecutively in a line, and the second pixel may be interposed between the first and third pixels. The first and third pixels of each phase detection pixel group may have the first integration time, and the second pixel of each phase detection pixel group may have the second integration time. The first, second, and third pixels of each phase detection pixel group may have the first integration time. The first integration time may be longer than the second integration time.

In various embodiments, a method of operating an image sensor with a pixel array that includes a plurality of image pixels and a plurality of phase detection pixels may include generating charge for a first integration time with a first portion of the plurality of image pixels, generating charge for a second integration time that is different than the first integration time with a second portion of the plurality of image pixels, and generating charge for the first integration time with the first and third pixels of each phase detection pixel group. The plurality of phase detection pixels may include phase detection pixel groups, and each phase detection pixel group may include a first pixel, a second pixel, and a third pixel. The method may also include generating charge for the second integration time with the second pixel of each phase detection pixel group.

The foregoing is merely illustrative of the principles of this invention and various modifications can be made by those skilled in the art without departing from the scope and spirit of the invention.

What is claimed is:

1. An image sensor having a pixel array, wherein the pixel array comprises:
   a plurality of image pixels that gather image data; and
   a plurality of phase detection pixels that gather phase information, wherein the phase detection pixels are arranged in phase detection pixel groups, wherein each phase detection pixel group includes three adjacent pixels, wherein the three adjacent pixels of each phase detection pixel group comprise a first pixel, a second pixel, and a third pixel, wherein the second pixel is interposed between the first and third pixels, wherein a first microlens covers the first pixel and at least a portion of the second pixel, and wherein a second microlens covers the third pixel and at least an additional portion of the second pixel.

2. The image sensor defined in claim 1, wherein the first microlens covers all of the first pixel and a first half of the second pixel, and wherein the second microlens covers all of the third pixel and a second half of the third pixel.

3. The image sensor defined in claim 1, wherein a third microlens covers the first pixel, wherein a fourth microlens covers the second pixel, wherein a fifth microlens covers the third pixel, wherein the first microlens covers the third microlens and at least a portion of the fourth microlens, and wherein the second microlens covers the fifth microlens and at least an additional portion of the fourth microlens.

4. The image sensor defined in claim 1, wherein the phase detection pixel groups are arranged in interrupted lines.

5. The image sensor defined in claim 1, further comprising:
   a color filter array, wherein each phase detection pixel includes a respective color filter element, and wherein the color filter elements of the phase detection pixels are all the same color.

6. The image sensor defined in claim 1, further comprising:
   a color filter array, wherein each phase detection pixel includes a respective color filter element, wherein the first and third pixels include color filter elements of a first color, and wherein the second pixel includes a color filter element of a second color that is different than the first color.

7. The image sensor defined in claim 6, wherein the second pixel is separated from the first and third pixels by backside deep trench isolation.

8. The image sensor defined in claim 6, further comprising shielding elements interposed between color filter elements of the color filter array.

9. The image sensor defined in claim 6, wherein the second pixel is at least partially covered by a shielding element.

10. The image sensor defined in claim 1, wherein the plurality of image pixels includes a first group of image pixels that are configured to generate charge for a first integration time and a second group of image pixels that are configured to generate charge for a second integration time, wherein the first integration time is different than the second integration time.

11. The image sensor defined in claim 10, wherein the first and third pixels are configured to generate charge for the first integration time, and wherein the second pixel is configured to generate charge for the second integration time.

12. The image sensor defined in claim 10, wherein the three adjacent pixels of each phase detection pixel group are configured to generate charge for the first integration time.

13. An image sensor having a pixel array, wherein the pixel array comprises:
 a plurality of image pixels that gather image data, wherein the plurality of image pixels includes a first group of image pixels with a first integration time and a second group of image pixels with a second integration time, wherein the first integration time is different than the second integration time; and
 a plurality of phase detection pixels that gather phase information, wherein the plurality of phase detection pixels is arranged in phase detection pixel groups, wherein each phase detection pixel group includes a first pixel, a second pixel, and a third pixel arranged consecutively in a line, wherein the second pixel is interposed between the first and third pixels, wherein the first, second, and third pixels are the only pixels in each phase detection pixel group, wherein the first and third pixels of each phase detection pixel group have the first integration time, and wherein the second pixel of each phase detection pixel group has the second integration time.

14. The image sensor defined in claim 13, wherein the first integration time is longer than the second integration time.

15. A method of operating an image sensor with a pixel array that includes a plurality of image pixels and a plurality of phase detection pixels, wherein the plurality of phase detection pixels comprises phase detection pixel groups, and wherein each phase detection pixel group includes a first pixel, a second pixel, and a third pixel, the method comprising:
 with a first portion of the plurality of image pixels, generating charge for a first integration time;
 with a second portion of the plurality of image pixels, generating charge for a second integration time that is different than the first integration time;
 with the first and third pixels of each phase detection pixel group, generating charge for the first integration time; and
 with the second pixel of each phase detection pixel group, generating charge for the second integration time.

* * * * *